United States Patent
Koskela et al.

(10) Patent No.: US 11,968,718 B2
(45) Date of Patent: Apr. 23, 2024

(54) RANDOM ACCESS PREAMBLE SELECTION

(71) Applicant: Nokia Technologies Oy, Espoo (FI)

(72) Inventors: Timo Koskela, Oulu (FI); Samuli Turtinen, Ii (FI); Juho Pirskanen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 81 days.

(21) Appl. No.: 16/092,876

(22) PCT Filed: Apr. 7, 2017

(86) PCT No.: PCT/FI2017/050250
§ 371 (c)(1),
(2) Date: Oct. 11, 2018

(87) PCT Pub. No.: WO2017/178697
PCT Pub. Date: Oct. 19, 2017

(65) Prior Publication Data
US 2019/0208547 A1     Jul. 4, 2019

Related U.S. Application Data (60) Provisional application No. 62/323,081, filed on Apr. 15, 2016.

(51) Int. Cl.
*H04W 74/0833*     (2024.01)
*H04B 7/06*     (2006.01)
(Continued)

(52) U.S. Cl.
CPC ...... *H04W 74/0833* (2013.01); *H04B 7/0617* (2013.01); *H04B 7/0695* (2013.01);
(Continued)

(58) Field of Classification Search
CPC ......... H04W 74/0833; H04W 72/0446; H04W 24/10; H04W 72/046; H04W 16/28;
(Continued)

(56) References Cited

U.S. PATENT DOCUMENTS

| 10,009,929 | B1 * | 6/2018 | Zhou | H04W 74/0833 |
| 2007/0213011 | A1 * | 9/2007 | Kim | H04B 17/345 |
| | | | | 455/63.1 |

(Continued)

FOREIGN PATENT DOCUMENTS

| CN | 102668406 A | 9/2012 |
| CN | 105379357 A | 3/2016 |

(Continued)

OTHER PUBLICATIONS

ZTE, "Further analysis on preamble transmission in NB-IoT", 3GPP TSG-RAN WG2 Meeting #93bis, R2-162360, Apr. 11-15, 2016 (Year: 2016).*

(Continued)

*Primary Examiner* — Thinh D Tran
(74) *Attorney, Agent, or Firm* — Harrington & Smith (57) ABSTRACT

Various communication systems may benefit from the appropriate selection of aspects of operation of the communication system. For example, certain wireless communication systems, such as fifth generation (5G), long term evolution advanced (LTE-A), and wireless local area network (WLAN) communication systems, may benefit from appropriate random access preamble selection. A method can include determining that a user equipment should consider at least one beam-specific parameter. The method can also include indicating to the user equipment to consider the at least one beam-specific parameter.

20 Claims, 4 Drawing Sheets

(51) Int. Cl.
*H04B 7/08* (2006.01)
*H04L 5/00* (2006.01)
*H04W 16/28* (2009.01)
*H04W 24/10* (2009.01)
*H04W 72/044* (2023.01)
*H04W 72/0446* (2023.01)

(52) U.S. Cl.
CPC ........... *H04B 7/088* (2013.01); *H04L 5/0055* (2013.01); *H04W 16/28* (2013.01); *H04W 24/10* (2013.01); *H04W 72/0446* (2013.01); *H04W 72/046* (2013.01)

(58) Field of Classification Search
CPC ..... H04L 5/0055; H04B 7/0617; H04B 7/088; H04B 7/0695
See application file for complete search history.

(56) References Cited

U.S. PATENT DOCUMENTS

| | | | | |
|---|---|---|---|---|
| 2012/0076126 A1* | 3/2012 | Yi | ........................ | H04W 74/085 370/338 |
| 2013/0121185 A1* | 5/2013 | Li | ........................ | H04W 24/10 370/252 |
| 2014/0064207 A1* | 3/2014 | Ramos | .............. | H04W 74/0833 370/329 |
| 2014/0177607 A1* | 6/2014 | Li | ........................ | H04B 7/0617 370/336 |
| 2014/0286300 A1 | 9/2014 | Choi et al. | ..................... | 370/329 |
| 2014/0376466 A1* | 12/2014 | Jeong | ................ | H04W 74/0833 370/329 |
| 2014/0379466 A1 | 12/2014 | Jeong et al. | .................. | 370/329 |
| 2015/0382205 A1* | 12/2015 | Lee | ....................... | H04B 7/0417 370/329 |
| 2016/0021549 A1 | 1/2016 | Subramanian et al. | | |
| 2016/0029358 A1* | 1/2016 | Hou | ................... | H04W 74/0833 370/329 |
| 2017/0026962 A1* | 1/2017 | Liu | ....................... | H04B 7/0617 |
| 2017/0215117 A1* | 7/2017 | Kwon | ............... | H04W 36/0094 |
| 2019/0104549 A1* | 4/2019 | Deng | ................ | H04W 72/0446 |

FOREIGN PATENT DOCUMENTS

| | | |
|---|---|---|
| WO | WO-2013073825 A1 | 5/2013 |
| WO | WO 2015/144256 A1 | 10/2015 |
| WO | WO-2015/147717 A1 | 10/2015 |

OTHER PUBLICATIONS

ZTE, "Summary of email discussion [93bis#07][NB-IOT] RACH open issues", 3GPP TSG-RAN WG2 NB-IoT AdHoc, R2-163251, May 3-4, 2016 (Year: 2016).*

* cited by examiner

RANDOM ACCESS PREAMBLE SELECTION

CROSS-REFERENCE TO RELATED APPLICATION

This patent application is a U.S. National Stage application of International Patent Application Number PCT/FI2017/050250 filed Apr. 7, 2017, and claims priority to U.S. provisional application 62/323,081 filed Apr. 15, 2016, which are hereby incorporated by reference in their entireties.

BACKGROUND

Field

Various communication systems may benefit from the appropriate selection of aspects of operation of the communication system. For example, certain wireless communication systems, such as fifth generation (5G), long term evolution advanced (LTE-A), and wireless local area network (WLAN) communication systems, may benefit from appropriate random access preamble selection.

Description of the Related Art 5G radio access may rely on different transceiver architectures: digital, analog, or so-called hybrid, which utilizes a hybrid of digital baseband processing, such as multiple input multiple output (MIMO) and/or digital precoding. Although some of the following discussion refers to analog beamforming, fully analog or hybrid transceiver, the described techniques, methods, and systems may be applied also to digital beamforming transceiver architecture Beamforming is used in the provision of cell coverage to compensate the increased path loss when operating on higher frequencies. The aforementioned transceiver architectures provide ways of implementing beamforming in future systems depending on the cost and complexity limitations. As an example, systems deployed to lower frequencies such as sub 6 GHz may be implemented by using fully digital architecture. The higher frequencies where the number of antenna elements required for cell coverage may range from tens to hundreds may be implemented by using hybrid-architecture, or even fully analog architecture. These systems, architectures, and frequency bands are provided by way of illustration and not limitation. The same principles can be applied other architectures or frequency bands, even though an artificial division of lower and higher frequencies is made in this example, for ease of explanation.

In 5G, a so-called sweeping sub-frame may be introduced to provide coverage for common control channel signaling with beam forming. Sweeping sub-frame includes sweeping blocks (SB) where a single block covers a specific area of the cell with a set of active beams.

Figure 1:
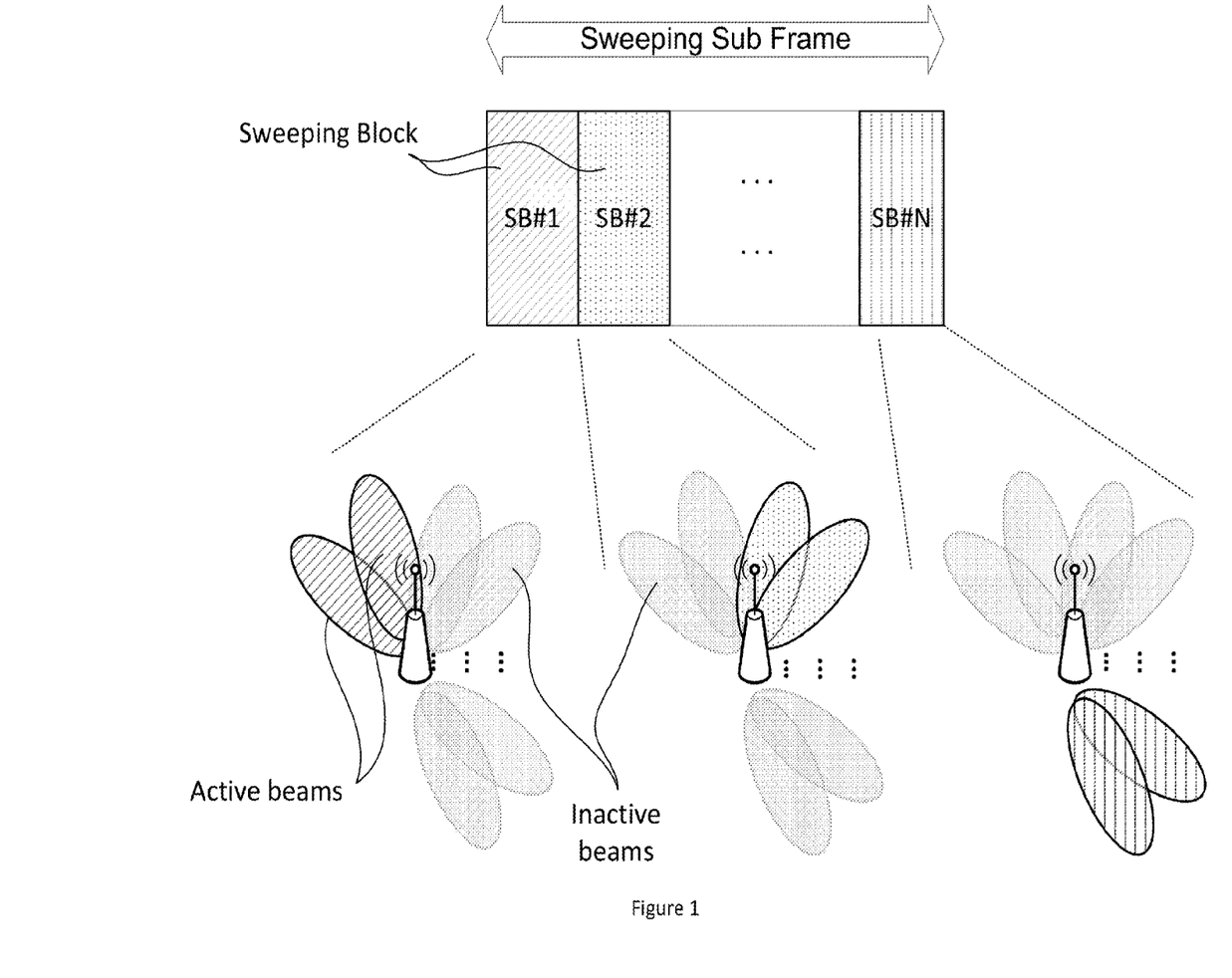
FIG. 1 illustrates a sweeping sub-frame.

FIG. 1 illustrates a sweeping sub-frame. Total number of beams required to cover required cell area is typically much larger than the number of concurrent active beams the access point is able to form. Therefore access points need to sweep through the cell coverage area in the time domain by activating different set of beams on each SB. Depending on the number of active beams per sweep block and the total number of beams required to cover a cell area, multiple sweep blocks may be needed. Also, the number of sweep blocks per sub-frame is limited by the length of each sweep. As an example, one SB duration may be one or two symbols, of orthogonal frequency division multiplexing (OFDM). In some cases one SB duration may be even more than two symbols, depending on such factors as the amount of information transmitted in each SB. If there are 14 symbols per sub-frame and no guard symbols or uplink control and downlink control symbols are present, the sweeping sub-frame would be able to accommodate 7 SBs (each SB is 2 symbols). Depending on the number of SBs required to cover a cell, not only in azimuth plane but also in elevation plane, multiple sweeping sub-frames may be needed.

The active beam depicted in FIG. 1 may be used for either transmitting or receiving information. Thus, the sweeping sub-frame can be defined as downlink sweeping sub-frame or an uplink sub-frame. Further, assuming time division duplex (TDD) system and reciprocity between downlink and uplink channels, to cover cell area on uplink and downlink direction with same beam configurations per sweeping block essentially the same SBs need to be defined on uplink and downlink direction.

As an example of downlink direction, if downlink common control channel coverage is provided by the sweeping sub-frame, each SBs would carry essential cell access information such as downlink (DL) synchronization signals, system information such as master information block (MIB)/system information block (SIB) or the like (including physical random access channel (PRACH)/random access channel (RACH) configurations), as well as paging or any control information that needs to be broadcasted in a cell). In the uplink direction the sweeping sub-frame/sub-frames may accommodate resources for random access channel and/or other uplink channels requiring periodic availability such as scheduling request (SR).

In a beam formed system where the cell coverage is provided by multiple beams, it may be beneficial to identify a single beam in a sweep block for example by using beam specific reference signals enabling a user equipment (UE) to perform beam level detection/separation. The beam specific reference symbols are reused in the next SB but the SB identifier (which may be explicitly signaled in each SB or calculated by using time domain mapping to a known time reference) is used to separate beams of different SBs. Thus one way to calculate beam identifier is to simply calculate Beam_RS_ID*Sweep_Block_ID. In a special case where only one beam is formed per SB (e.g. a system using fully analog beamforming) the SB identifier is the beam identifier. Identifying beams may be beneficial in some cases, such as when a UE indicates to the network the preferred communication beam during initial access or refers to a specific beam when reporting measurements.

SUMMARY

According to a first embodiment, a method can include detecting a plurality of signal beams and measuring signal strength of each beam of the plurality of signal beams. The method can further include selecting a first beam of the plurality of signal beams having a highest signal strength of the plurality of signal beams and selecting a second beam of the plurality of signal beams having a signal strength above a threshold. Finally the method can include performing random access channel resource selection from random access channel resources of the first beam and random access channel resources of the second beam, for random access transmission.

According to a second embodiment, a method can include determining that a user equipment should consider at least one beam-specific parameter. The method can also include indicating to the user equipment to consider the at least one beam-specific parameter.

In a variant, the at least one beam-specific parameter can include a beam-specific random access channel parameter.

In a variant, the indicating can indicate to the user equipment how to use the at least one beam-specific parameter in a random access channel procedure.

In a variant, the at least one beam-specific parameter can include at least one of a beam reception level offset, a beam reception level reference threshold, or a preamble selection weight.

In a variant, the at least one beam-specific parameter can include at least one beam-specific back-off indicator.

In a variant, the indication of the at least one beam-specific parameter can include sending the at least one beam-specific parameter in system information broadcast in a system information block.

In a variant, the system information block can be transmitted during a specific downlink sub-frame or on a downlink shared channel on resources that are explicitly scheduled.

According to a third embodiment, a method can include receiving, at a user equipment, an indication to consider at least one beam-specific parameter. The method can also include utilizing, by a user equipment, the at least one beam-specific parameter to select a beam-specific preamble based on the indication.

In a variant, the utilization of the at least one beam-specific parameter can include calculating a set of available contention-based preambles in cell during a random access channel procedure.

In a variant, the utilization of the at least one beam-specific parameter can include at least one of obtaining information signaled in system information; determining beam indices fulfilling criteria determined by the at least one beam-specific parameter; and considering preambles that map to the determined beam indices as potential preambles for contention-based random access channel access.

In a variant, the method can further include determining weights for determining preamble selection probabilities in random selection of preambles.

The third embodiment can include the same variants with respect to the various parameters as the second embodiment.

According to fourth, fifth and sixth embodiments, an apparatus can include means for performing the method according to the first, second and third embodiments respectively, in any of their variants.

According to seventh, eighth and ninth embodiments, an apparatus can include at least one processor and at least one memory and computer program code. The at least one memory and the computer program code can be configured to, with the at least one processor, cause the apparatus at least to perform the method according to the first, second and third embodiments respectively, in any of their variants.

According to tenth, eleventh and twelfth embodiments, a computer program product may encode instructions for performing a process including the method according to the first, second and third embodiments respectively, in any of their variants.

According to thirteenth, fourteenth and fifteenth embodiments, a non-transitory computer readable medium may encode instructions that, when executed in hardware, perform a process including the method according to the first, second and third embodiments respectively, in any of their variants.

According to sixteenth, seventeenth and eighteenth embodiments, a system may include at least one apparatus according to the fifth or eighth embodiments in communication with at least one apparatus according to the sixth or ninth embodiments, respectively in any of their variants.

BRIEF DESCRIPTION OF THE DRAWINGS

For proper understanding of the invention, reference should be made to the accompanying drawings, wherein.

DETAILED DESCRIPTION

When performing initial access to a system via a random access channel (RACH) procedure in a beam formed system, a UE can indicate a preferred communication beam to an access point by selecting randomly an RA-preamble from a beam specific set of preambles. To determine a preferred, for example best or strongest, communication beam a UE may perform a set of measurements on the (beam specific) reference signals transmitted during a downlink sweep. The UE may detect multiple beams during the DL sweep. In real radio wave propagation environments the coverage areas of different beams may overlap, for example transmissions may be reflected from the surroundings so that multiple beams can reach a UE, the beams may be aligned to overlap with one another, or there may be significant side lobes of certain beams overlapping with other beams.

The RACH/PRACH configuration signaled by higher layers, such as radio resource control (RRC), in for example SIB (in LTE RACH/PRACH configuration is provided in SIB2) can provide a UE with the necessary information in order to determine the time and frequency location of the PRACH resources, for example the preamble resources, but also information about the beam specific mapping of the preambles.

The PRACH channel can be mapped to UL sweeping sub-frames so that during one sweep block the PRACH resources map to the beams which are active on during that PRACH. A sub-frame can potentially contain multiple sweep blocks. In one example the PRACH resources, called PRACH slots, may be mapped in the frequency domain so that each beam index maps to one or multiple slots or multiple beams share the preambles of one RACH slot. Each slot can include one or more physical resource blocks (PRBs) and can have a length of at least one symbol.

Figure 2:
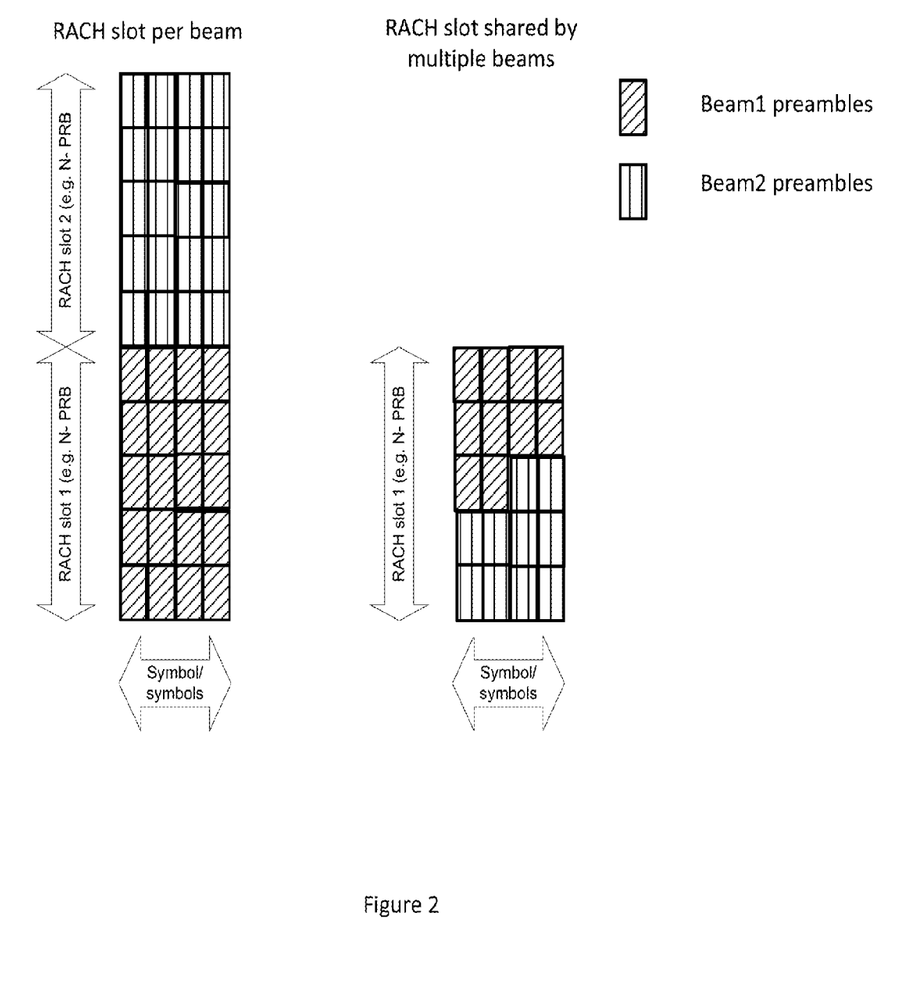
FIG. 2 illustrates mapping of preambles to slots.

FIG. 2 illustrates mapping of preambles to slots. More particularly, FIG. 2 illustrates mapping of beam specific preambles to RACH slots where two beams have dedicated RACH slots, or two beams share the preambles of one RACH slot.

As the PRACH slot length may vary from one symbol to multiple symbols, depending on the requirements, such as cell size or delay spread, there may not be a one to one mapping of downlink and uplink sweep blocks. Thus, one potential configuration is that when downlink sweep block occupies one symbol the corresponding uplink (UL) sweep block may occupy two symbols.

With beam forming, for example when using analog beamforming, it may be desirable to avoid excessive periodic signals in either downlink (DL) or UL direction. One way to overcome this is that periodic signals such as scheduling request (SR) resources can be multiplexed with RACH resources (or SR resources can be allocated from the RACH resources) in the frequency domain in the UL sweep block. However, this also decreases the available RACH preamble space, as there is a limited amount of frequency resources, and thus RACH slots, available per UL sweep block One way to increase RACH preamble space, or number of preambles, per beam is to configure more RACH slots in time domain, for example more UL sweep blocks, but this also increases overhead.

One alternative way to expand the preamble base is to allow the UE to initiate simultaneously multiple RACH procedures per cell by transmitting on RACH resources mapping to multiple beams. This increases the probability that the UE will receive random access response (RAR) corresponding to at least one of the beams but may also increase the collision probability when multiple UEs transmit in a similar manner. Also, this approach may increase resource utilization, the network may have to schedule RAR to each of the detected preambles. Furthermore, this approach may increase UE complexity as the UE may need specified mechanisms to handle multiple RACH procedures.

Some beams may be more crowded than other beams in a system. For example, more UEs may access from one place/beam, which may also increase the probability of collisions during random access.

Certain embodiments leverage the potential of a UE detecting multiple beams during a DL sweep but in a manner such that the network (NW) is able to provide access control and ensure sufficient quality for the random access procedure and potentially for any subsequent message transfers.

Certain embodiments can expand the set of preambles that the UE uses to consider in the random selection when performing the initial access or when performing access on the RACH channel in general. Examples of performing access on the RACH channel general include, but are not limited to, recovering from a beam (link) failure, sending SR when no SR resources are available, obtaining UL synchronization, and the like. This expanded set of preambles can spread the random access load and reduce collision probability.

To expand the number of preambles, the NW can instruct the UE to consider multiple beams for initial access by configuring thresholds to consider beams relative to the best beam. With beam specific preambles in the system, the number of available preambles for random selection can increase.

Certain embodiments provide a method that includes a signaling procedure that may reduce collision probability on RACH preambles in a beam formed system.

Figure 3:
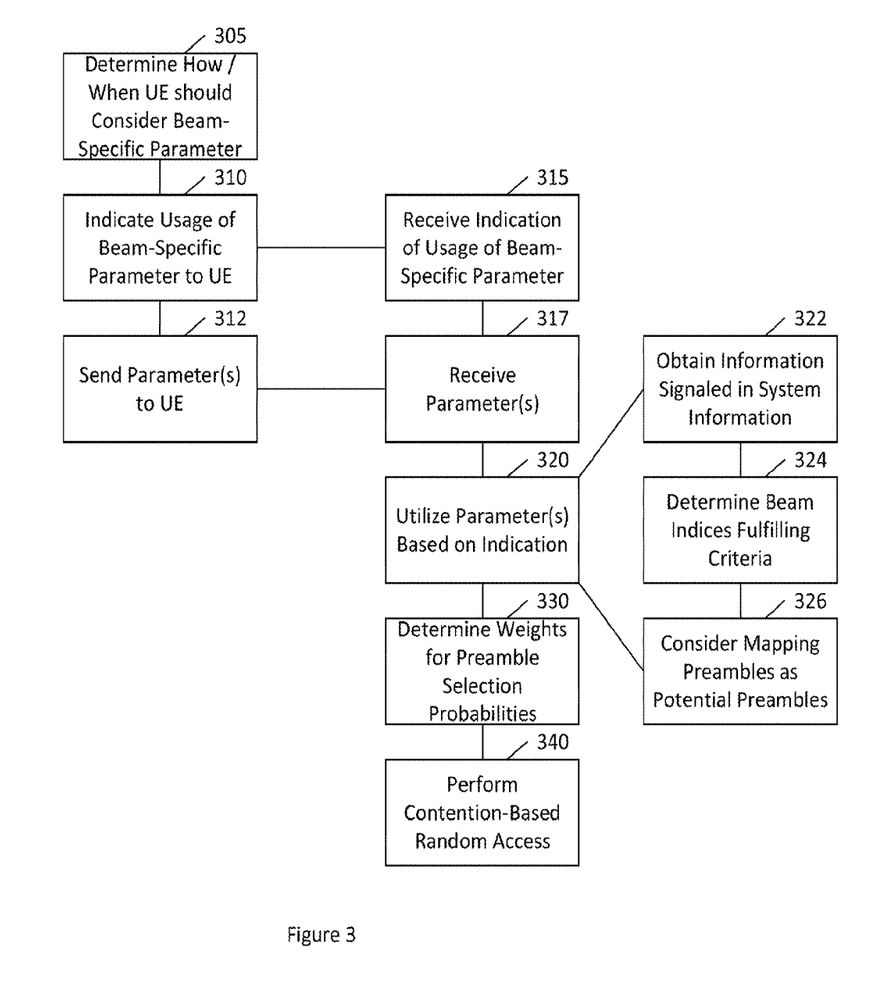
FIG. 3 illustrates a method according to certain embodiments.

FIG. 3 illustrates a method according to certain embodiments. The method can include, at 310, indicating to a user equipment to consider at least one beam-specific parameter, such as a beam-specific random access channel parameter. For example, a network element can indicate to a user equipment that a particular beam-specific parameter is to be taken into account when selecting multiple beams.

To expand the number of preambles, the NW can instruct the UE to consider multiple beams for initial access by configuring thresholds. These thresholds can be used to judge beams relative to a best beam. With beam specific preambles in the system, the number of available preambles for random selection may increase.

Although the NW can instruct the UE to select multiple beams, only the beams that are above threshold may be considered by the UE. As the UE may hear multiple beams with very different power levels, it is to the advantage of both the NW and the UE that beams with too low quality are not considered but beams with good quality are considered, so that, for example, the message exchange after preamble transmission can be carried out.

Thus, for example, the method can include indicating in system information when and/or how to consider at least one of the following set of beam specific RACH parameters in RACH procedure: BeamRxLevelOffset, BeamRxLevelReferenceThreshold, or PreambleSelectionWeight. Accordingly, the at least one beam-specific parameter can include at least one of a beam reception level offset, a beam reception level reference threshold, or a preamble selection weight, of which BeamRxLevelOffset, BeamRxLevelReferenceThreshold, or PreambleSelectionWeight are examples. Other parameters may include, for example, a beam-specific back-off indicator. Each of these parameters is discussed below, by way of illustration and example.

This indicating can be performed on a network side, based on a determination at 305 as to what to indicate. Thus, at 305, the method can include determining that, when, and/or how a user equipment should consider at least one beam-specific parameter. The indicating at 310 can then proceed accordingly, and the indication can be received at the use equipment at 315.

The method can also include, at 320, utilizing, by a UE, at least one of the parameters, based on the indication. More particularly, the method can include utilizing, by the user equipment, at least one beam-specific parameter to select a beam-specific preamble.

For example, the method can include utilizing the parameters to calculate a set of available contention based preambles in a cell during a RACH procedure. The utilizing can include one or more of the following operations at 322, 324, and 326.

The method can include, at 322, obtaining information signaled in system information, such as in system information block (SIB). The method can also, or alternatively, include at 324 determining beam indices fulfilling criteria determined by beam specific RACH parameters. Moreover, the method can also or alternatively include, at 326, considering the preambles that map to determined beam indices as potential preambles for contention based RACH access.

The method can also include, at 330, determining, when signaled, the appropriate weights for determining preamble selection probabilities in random selection of preambles.

The method can further include the network side, at 312, sending the parameters, for example RACH configuration parameters, which can be received at the UE at 317. The parameters can be sent in system information broadcast in a system information block such as SIB2 or the like. The SIB may be transmitted during a specific downlink sweep (in sweep blocks mapped to one or multiple sub-frames) or on downlink shared channel (DL-SCH) on resources that are explicitly scheduled. Alternatively, rather than receiving the parameters from the network, the UE may be pre-configured with parameters or may determine the parameters autonomously from the network. One way to indicate a predetermined set of parameters is to map specific parameters to, for example, a specific RACH/PRACH configuration index.

The UE can measure and determine the beam index with best quality by reference signal received power (RSRP) and/or reference signal received quality (RSRQ) and can set these values for BeamRxLevelReference. Some example NW side parameters are discussed below.

BeamRxLevelOffset can indicate the beam specific RX level offset value from the BeamRxLevelReference for determining whether the preambles mapping to the beam index can be considered in the random selection of contention based preambles. When a beam specific RX level is higher (alternatively, equal or higher) than BeamRxLevelThreshold where BeamRxLevelThreshold=BeamRxLevelReference+BeamRxLevelOffset, the beam specific contention based preambles can be considered in the random selection.

BeamRxLevelOffset may have one explicit value such as 0, −3 dB, −6 dB, −9 dB, or the like. The value of BeamRxLevelOffset can be signaled by a logical value of, for example, 0 . . . 7.

One value of BeamRxLevelOffset may be reserved to indicate that such offset is not in use. For example, the value of "0" may be the reserved value. Alternatively the configuration information element (IE) may be optionally present in the configuration.

Alternatively, the offset value may be a step size, such as 1 dB, 3 dB, or 6 dB, so that when utilized in combination with weighting parameter, each further step size reduces the probability of selecting the preambles affiliated with that beam index.

BeamRxLevelReferenceThreshold can indicate a threshold level to determine whether the BeamRxLevelOffset parameter is used for determining the available set of preambles for contention based access.

If the BeamRxLevelReference, for example the level of the strongest beam, is below the quality/level indicated by BeamRxLevelReferenceThreshold, the UE may not consider preambles of multiple beams to be available for random selection Alternatively, BeamRxLevelReferenceThreshold may indicate a scaling factor for the BeamRxLevelOffset. Thus, the lower the RX quality of the strongest beam the lower the value of BeamRxLevelOffseescaling factor results. Thus, stricter criteria can be imposed for determining preambles' space when the signal quality is weak.

PreambleSelectionWeight is another parameter that can be used. For example, in certain embodiments, the NW may signal selection weights for the preambles that are determined to be available. For example, if the UE detects a beam which RX level is 3 dB below the RX level of the strongest beam, the preambles may have equal probability with the preambles of the strongest beam but the preambles of a beam which RX level is 6 dB below the strongest one may have weighted probability of 0.8, or any configured number. Thus, the UE may be less likely to select preambles of such beams, while the beams can remain in the set of selectable preambles.

In certain embodiments, the NW may explicitly signal the number of measurements the UE is required to perform before it is allowed to determine preambles of additional beams as available. Such measurement configuration may also be predetermined rather than explicit signaling being used.

In certain embodiments, when signaled in system information, the UE can transmit a beam report in RACH MSG3 or in the first UL message during RACH procedure. The beam report format may be implicitly determined by the RACH parameters in SIB2 or explicitly triggered by network when allocating resources for MSG3.

If determined by the RACH parameters, the UE can include the beam_index+RSRP/RSRQ value of all the beams it considered in the RACH procedure. Alternatively, there can be a fixed format such that the UE can report, for example, the two strongest beams detected during or prior to a random access procedure.

In one option, a truncated beam report may be determined and sent if there is not enough room in the UL grant sent in MSG2. In another option, the beam report, which may optionally be truncated, can list the beam indices in quality order. The beam report, whether truncated or not, may be a medium access control (MAC) control element (CE) or a radio resource control (RRC) level message.

In certain embodiments, a NW may signal a beam-specific back-off indicator (BBI) in an RAR. The beam specific back-off indicator can indicate that the UE(s) receiving the back-off indicator, and optionally a value, is prohibited from sending a RACH preamble mapping to the beam for rand_uniform(0,N milliseconds), where N can be a predetermined value or the signaled value.

When signaled by the network, the UE can be allowed to re-initiate a RACH procedure by utilizing a preamble mapping to another beam(s) where, in one example, the beam received power level is at least higher than RACH re-initiate threshold level=BeamRxLevelReference+BeamRxLevelOffset*re-initiate factor.

By signaling the re-initiate factor parameter, the NW may further ensure that the UE initiates the RACH procedure only to beams with quality. Such parameter may also be preconfigured.

Alternatively, such a threshold level may also obligate the UE to select the next RACH preamble from a set fulfilling the criteria, for example excluding the beam that received the back-off indicator. In one example, when the UE has re-initiated a RACH procedure to an another beam, the UE may be allowed to ramp-up the preamble transmission power to compensate the RXlevel difference, or compensate it with specific scaling factor, so that the difference is only partially compensated.

The method can also include, at 340, the user equipment performing a contention-based random access procedure. This random access procedure can be performed based on the determined preambles from the preceding steps of the method.

Figure 4:
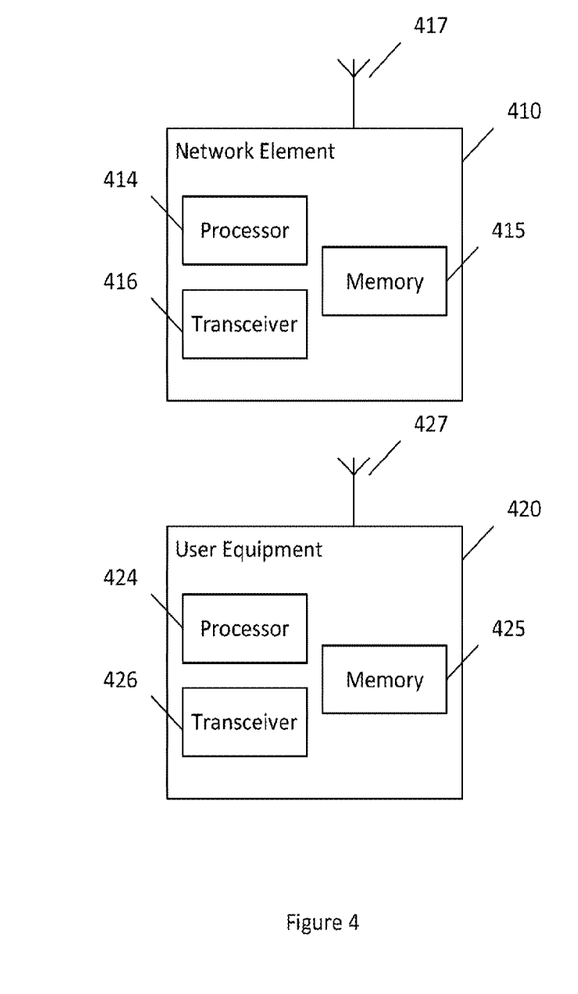
FIG. 4 illustrates a system according to certain embodiments.

FIG. 4 illustrates a system according to certain embodiments of the invention. It should be understood that each block of the flowchart of FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), or any other network element.

Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments described above. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One or more functionalities may also be implemented as a virtual application that is provided as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, smart watch, vehicle communication system, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may decrease the collision probability for the UE's random access. For example, when the UE has multiple beams to select from, the beam report in RA MSG3 can be used for the NW to determine the best beam.

The back-off indicator mechanism can allow faster access for the UEs to which it would be possible via other beams. Moreover, the back-off indicator mechanism may provide a fast and flexible way to distribute the RACH load between beams. Moreover, the offset/threshold parameters may serve as longer term mechanism to adjust the RACH load between or among beams.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

BBI Beam Specific Back-off Indicator
MAC CE MAC Control Element
MSG2 Message 2 in RACH procedure (or the first network side message after receiving UE's preamble transmission
MSG3 Message 3 in RACH procedure (or the first UE side message containing data)
RACH Random Access Channel
UE User Equipment

We claim:
1. A method, comprising:
receiving, at a user equipment of a communication network, an indication to use at least one beam-specific random access channel parameter, wherein the at least one beam-specific random access channel parameter comprises a beam reception level reference threshold;
determining one or more beam indices of a cell fulfilling at least one criteria utilizing the beam reception level reference threshold;

selecting a first beam-specific random access channel preamble for one of the one or more beam indices;
performing random access based on at least the first beam-specific random access preamble;
receiving a beam-specific backoff indicator for the one of the one or more beam indices in a random access response; and
when configured by the communication network, by using the beam-specific backoff indicator to prohibit the user equipment from sending a random access channel signal using the first beam-specific random access channel preamble for a predefined time period for the one of the one or more beam indices, re-initiating random access utilizing a second beam-specific random access channel preamble for another one of the one or more beam indices based on a reception level of the another one of the one or more beam indices being equal to or higher than the beam reception level reference threshold.

2. The method of claim 1, wherein the utilization of the at least one beam-specific random access channel parameter comprises determining a set of available contention-based preambles in a cell during a random access channel procedure.

3. The method of claim 1, wherein the selecting comprises considering preambles that map to at least one beam index of the one or more beam indices as potential preambles for contention-based random access channel access.

4. The method of claim 1, wherein the determining one or more beam indices of a cell fulfilling the at least one criteria is based on a beam quality associated with the one or more beam indices, and wherein the beam quality is based on at least one of a reference signal received power or a reference signal received quality.

5. The method of claim 1, wherein the indication indicates to the user equipment how to use the at least one beam-specific random access channel parameter in a random access channel procedure.

6. The method of claim 1, wherein the at least one beam-specific random access channel parameter further comprises at least one of a beam reception level offset, or a preamble selection weight.

7. The method of claim 1, wherein the at least one beam-specific random access channel parameter further comprises at least one beam-specific back-off indicator.

8. The method of claim 1, wherein the predefined time period has a value of N milliseconds received from the communication network, wherein N is an integer; and the method comprising:
based on the re-initiating, increasing a beam-specific random access channel preamble transmission power to compensate a reception level difference with a scaling factor at least partly.

9. An apparatus, comprising:
at least one processor; and
at least one memory including computer program code,
wherein the at least one memory and the computer program code are configured to, with the at least one processor, cause the apparatus at least to:
receive, from a communication network, an indication to use at least one beam-specific random access channel parameter, wherein the at least one beam-specific random access channel parameter comprises a beam reception level reference threshold;
determine one or more beam indices of a cell fulfilling at least one criteria utilizing the beam reception level reference threshold;
select a first beam-specific random access channel preamble for one of the one or more beam indices;
perform random access based on at least the first beam-specific random access preamble;
receive a beam-specific backoff indicator for the one of the one or more beam indices in a random access response; and
when configured by the communication network, using the beam-specific backoff indicator to prohibit the apparatus from sending a random access channel signal using the first beam-specific random access channel preamble for a predefined time period for the one of the one or more beam indices, re-initiate random access utilizing a second beam-specific random access channel preamble for another one of the one or more beam indices based on a reception level of the another one of the one or more beam indices being equal to or higher than the beam reception level reference threshold.

10. The apparatus of claim 9, wherein the utilization of the at least one beam-specific random access channel parameter comprises determining a set of available contention-based preambles in a cell during a random access channel procedure.

11. The apparatus of claim 9, wherein the selecting comprises considering preambles that map to at least one beam index of the one or more beam indices as potential preambles for contention-based random access channel access.

12. The apparatus of claim 9, wherein the determining one or more beam indices of a cell fulfilling the at least one criteria is based on a beam quality associated with the one or more beam indices, and wherein the beam quality is based on at least one of a reference signal received power or a reference signal received quality.

13. The apparatus of claim 9, wherein the indication indicates to the apparatus how to use the at least one beam-specific random access channel parameter in a random access channel procedure.

14. The apparatus of claim 9, wherein the at least one beam-specific random access channel parameter further comprises at least one of a beam reception level offset, or a preamble selection weight.

15. The apparatus of claim 9, wherein the at least one beam-specific random access channel parameter further comprises at least one beam-specific back-off indicator.

16. An apparatus, comprising:
at least one processor; and
at least one memory including computer program code,
wherein the at least one memory and the computer program code are configured to, with the at least one processor, cause the apparatus at least to
indicate to a user equipment to select the at least one first beam-specific random access channel parameter, wherein the at least one beam-specific random access channel parameter comprises a beam reception level reference threshold,
wherein the indicating cause the user equipment to utilize the at least one first beam-specific random access channel parameter to determining one or more beam indices of a cell fulfilling at least one criteria utilizing the beam reception level reference threshold and select first beam-specific random access channel preamble based on the one or more beam indices;
receive a first random access with the first beam-specific random access preamble; and
communicate a beam-specific backoff indicator for the one of the one or more beam indices in a random access response such that, when configured by the apparatus, by the beam-specific backoff indicator to prohibit the user equipment from sending a random access channel signal using the first beam-specific random access channel preamble for a predefined time period for the one of the one or more beam indices, by receiving from the user equipment a second random access utilizing a second beam-specific random access channel preamble for another one of the one or more beam indices based on a reception level of the another one of the one or more beam indices being equal to or higher than the beam reception level reference threshold.

17. The apparatus of claim 16, wherein the utilizing is based on a beam-specific parameter being above the beam reception level reference threshold.

18. The apparatus of claim 16, wherein the at least one beam-specific random access channel parameter further comprises at least one of a beam reception level offset, or a preamble selection weight.

19. The apparatus of claim 16, wherein the at least one beam-specific random access channel parameter further comprises at least one beam-specific back-off indicator.

20. The apparatus of claim 16, wherein the indication of the at least one beam-specific random access channel parameter comprises sending the at least one beam-specific random access channel parameter in system information broadcast in a system information block.

\* \* \* \* \*